United States Patent [19]

Van Oostrum

[11] 3,800,081

[45] Mar. 26, 1974

[54] DEVICE FOR RECORDING DIFFRACTION IMAGES

[75] Inventor: Karel Jan Van Oostrum, Emmasingel, Eindhoven, Netherlands

[73] Assignee: U.S. Phillips Corporation, New York, N.Y.

[22] Filed: Apr. 20, 1972

[21] Appl. No.: 245,784

[30] Foreign Application Priority Data

Apr. 30, 1971 Netherlands .......................... 7105978

[52] U.S. Cl. .................................................. 178/7.2

[51] Int. Cl. .............................................. H04n 5/30

[58] Field of Search ............ 178/7.2, 6.8, DIG. 3, 5, 178/33, 36, 38, 37; 315/27, 23, 24

[56] References Cited

UNITED STATES PATENTS

| | | | |
|---|---|---|---|
| 2,674,917 | 4/1954 | Summerhayes | 178/DIG. 36 |
| 3,411,030 | 11/1968 | Henderson | 315/24 |
| 2,510,070 | 6/1950 | Cawein | 178/6.8 |

OTHER PUBLICATIONS

IEEE Spectrum, Oct. 1967, by R. F. Pease, "The Scanning Electron Microscope," pgs. 96–102.

*Primary Examiner*—Richard Murray
*Attorney, Agent, or Firm*—Frank R. Trifari

[57] ABSTRACT

In a device for producing patterns to be identified in polar coordinates, the pattern is imaged on a target of a television camera tube which is centre-symmetrically scanned. The image signals derived from the television camera tube are integrated over adjustable time units, for example, over a complete scanning circle. Pulse series are obtained from these integrated image signals by a modulator, the amplitude of each pulse being correlated to the integrated intensity, its location in the series being correlated to the position of the scanning line in the image.

12 Claims, 2 Drawing Figures

DEVICE FOR RECORDING DIFFRACTION IMAGES

Figure 1:
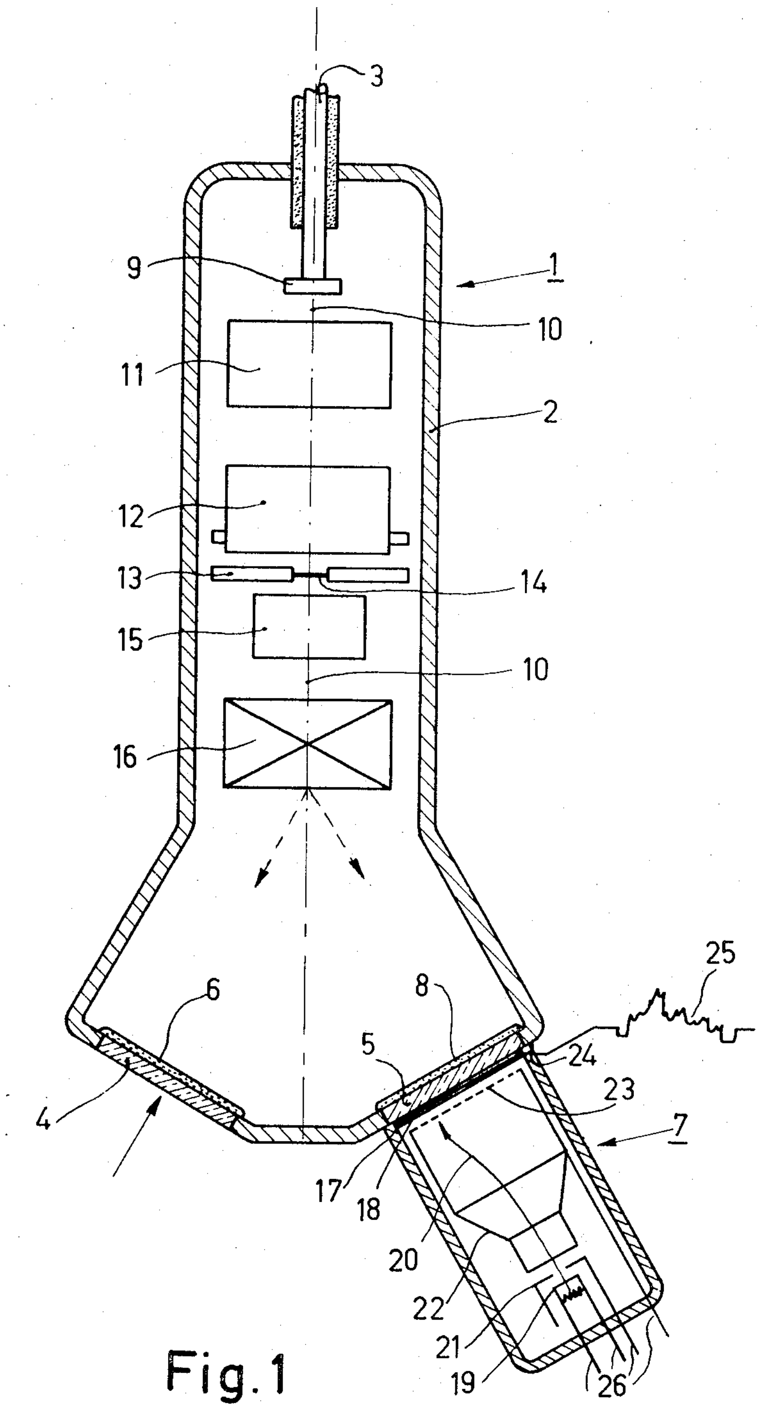

The invention relates to a device for recording and processing image information of a pattern which is formed by an imaging device and which is to be identified in polar coordinates. The invention relates in particular to a device for recording and processing diffraction images formed by an electron-optical device or by an X-ray diffraction apparatus.

According to a known method of measuring a diffraction image of a polycrystalline matter and composed of concentrical circles, the diffraction image is first recorded on a photographic plate and the photograph is subsequently measured by means of a densitometer. On the basis of rotation-symmetry in the diffraction recording, the blackness of an image is often measured along a centre line. A drawback of this method is that circles of the diffraction image which are situated further towards the edge can only be comparatively inaccurately localized and that the desired measuring data become available only at a later stage.

Also known is a method in which a diffraction image is projected onto a target of a television camera tube, the target being scanned in known manner by means of an electron beam. Due to the line by line scanning of the target, and the fact that the measuring data become available in cartesian coordinates, substantially more measuring points have to be processed according to this method than is necessary for proper identification of the diffraction image, so that this method necessitates a comparatively long and complex processing of the measuring points.

The invention has for its object to provide a device in which optimum use is made of the image information and the centre-symmetry present therein. To this end, a device of the kind set forth is characterized in that the device comprises means for projecting the pattern formed by the imaging device onto a target of a television camera tube with centre-symmetrical scanning, and an integrator for integrating an image signal, derived from the television camera tube, over at least a portion of a scanning line. In a device according to the invention a series of pulses is derived from the intensity distribution, the amplitude of the said pulses being a measure of the intensity, integrated over the scanning line, a portion of a scanning line, or a few scanning lines. The radius of the circle, or a measure of a mean radius in the case of helical scanning, is known from the scanning mechanism. In a preferred embodiment these data are applied to the store of a computer in which all desired operations can be performed on-line according to a comparatively simple calculating programme.

In a further preferred embodiment, the repetition frequency decreases during scanning from the image centre towards the edge of the image in a television camera tube. The image brightness is thus equalized.

Figure 2:
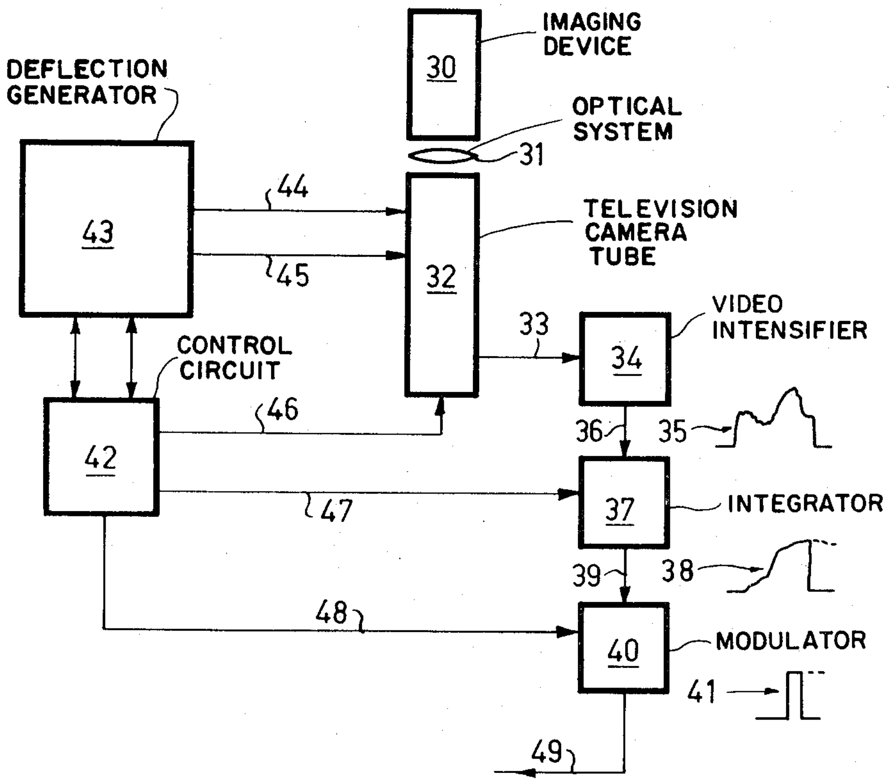

Hereinafter, one preferred embodiment according to the invention will be described in detail with reference to the drawing. In the drawing:

FIG. 1 is a diagrammatic view of an electron microscope, constructed for producing diffraction recordings and provided with a television camera tube, which is suitable for image recording according to the invention, and FIG. 2 is a block diagram of a device according to the invention.

In a preferred embodiment as shown in FIG. 1, the imaging device is composed of an electron microscope 1 having a vacuumtight wall 2 in which are provided a passage for a supply cable 3 and one or more recesses, closed by windows, for image observation. In the embodiment shown, two windows 4 and 5 are provided, it being possible to observe an image formed in a phosphor screen 6 via the window 4. Via the window 5, a television camera tube 7 is optically coupled to a phosphor screen 8. For connection to the television camera tube 7, the window 5 is preferably made of a fibre-optical plate which forms both the image window of the electron microscope and the entrance window of the television camera tube, thus providing the optical coupling. It is alternatively possible to use a detachable television camera tube having two fibre-optical plates or a lens-optical system for the optical coupling.

Provided in the wall 2 of the electron microscope 1 are a cathode 9 for generating an electron beam 10, a condenser lens 11, an objective lens 12, an object holder 13 with an object 14, a diffraction lens 15 and an electronoptical system 16 such as described, for example, in U.S. Pat. No. 3,629,578, by means of which the electron beam 10, carrying image information, can be optionally directed to one of the windows 4 or 5 so as to project an image thereon, which is a diffraction image in this case. In this embodiment the diffraction image can be alternately observed and recorded by means of the television camera tube. It is alternatively possible to provide the microscope wall 2 with an observation window such that an image screen to which a television camera tube is coupled can be observed inside the electron microscope through this observation window. For visual observations, use can also be made of a monitor fed by the television camera tube. Arranged in the television camera tube 7 are a signal electrode 17 and a photoconducting layer 18 which together constitute a target which is provided on the entrance window. The target of the television camera tube may also comprise a material having a b.i.c. (bombardment-induced conductivity) properties, in which case the relevant phosphor screen of the electron microscope can be dispensed with. The image-carrying electrons then form a charge pattern, caused by influencing of the electrical conductivity of the target, directly on the target. The window 5 must then be electron-permeable, but this does not involve any problems as a vacuum prevails on both sides of the window. If desired, the window 5 may be composed of a channel-amplifier plate. The television camera tube 7 also comprises a cathode 19 for generating an electron beam 20 which scans the target, a control grid 21, an acceleration anode 22, and a gauze electrode 23 for controlling and directing the electron beam 20. An image signal 25 can be derived from the signal electrode via an electrically conducting passage 24. Passages 26 are provided for the cathode, the control grid, the acceleration anode and the gauze electrode. The target of the television camera tube 7 is centre-symmetrically scanned by the electron beam 20. The target is preferably scanned in a system of concentrical circles. The number of scanning circles can be arbitrarily chosen in agreement with the image to be detected. The centre of the scanning circles must coincide with the symmetry centre of the image to be detected.

FIG. 2 shows a block diagram of a preferred embodiment according to the invention. An imaging device 30 is coupled to a television camera tube 32 by means of an optical system 31. Via a conductor 33, the signal-electrode current is applied to a video intensifier 34 in which it is amplified and converted into an image signal 35. Via a conductor 36, the image signal 35 is applied to an integrator 37 in which the signal is integrated over an adjustable period of time, i.e., over an adjustable writing-line portion. The integration result is applied, via a conductor 39, to a modulator 40 in the form of pulses 38. The modulator 40 generates pulses whose amplitude is modulated with the pulses 38. In dependence of a generator 43, feeding two orthogonally arranged deflection units for the scanning electron beam in the television tube via conductors 44 and 45, a detector 42 controls the beam current in the television camera tube via a conductor 46, starts and stops the integrator 37 at the correct scanning instants such as, for example, at the starting point or the terminating point of the scanning circle, via a conductor 47, and determines the desired integration time expressed in writing-line times. Via a conductor 48, the detector 42 supplies signals to the modulator 40 which correlate each pulse to be supplied by the modulator with a scanning circle on the target of the television camera tube. The modulator 40 thus produces a series of pulses, the amplitude of each pulse being proportional to the integrated intensity of a scanning line, the position of the pulse in the series of pulses indicating for each pulse which scanning line on the target of the television camera tube corresponds to the pulse. This series of pulses can be applied to a store of a computer via a conductor 49.

The target of the television camera tube in a preferred embodiment is circularly scanned and the integration time is equal to the scanning time for one complete circle. For the circular scanning, the generator supplies each of the deflection units with a sinusoidal voltage having a mutual phase difference of 90°. For changing over to a next scanning circle, the amplitude of the sinusoidal voltages has to be increased. In a preferred embodiment the effect of the inertia of the generator with the deflection systems is eliminated by directing the scanning beam to the next circle in a movement along the already recorded circle. The detector 42 then controls the beam current to zero. Integration over a plurality of circles, for example, each time 5 consecutive circles, imposes no problems, but can also be performed by scanning in fewer circles, possibly in combination with a larger target spot of the electron beam on the target. In the case of integration over each time a portion of a circle, such as may be desired in the case of diffraction images of monocrystals or materials having a given preferred orientation of the crystals (texture), the result must be thought to be a series of subseries of pulses, the beam being constant within the subseries. If desired, each subseries can be integrated to one pulse so that both subpulses and pulses over an entire circle are available.

When scanning is effected in the form of a continuous helix, it is possible, so as to obtain a more accurate determination of the position of, for example, a diffraction circle, to correlate the crossing of the scanning electron beam of an edge of the diffraction line to a signal-intensity level which is determined by the device from, for example, a maximum signal difference occurring between the most exposed areas and the darkest areas of the image.

For recording elliptical images, scanning can be adapted by introducing an amplitude difference, and possibly a phase difference, in the supply for the two deflection units. The realization of the scanning can always be adapted to the shape of the image to be recorded, a choice being possible between optimum adaptation of the scanning figure to the image so that the image-signal processing is comparatively simple, and keeping the scanning simple so that the image-signal processing will generally be somewhat more complex.

In a preferred embodiment the scanning beam has a constant current intensity over the entire larget during scanning. This intensity is adjusted such that enough signal is still derived from the outer circle. It was found that a constant beam current can be used for many applications. Should this not be feasible in special cases, the beam current can be modulated with the deflection via the detector 42 to achieve, for example, a beam current which increases in proportion to the radius of the scanning circle.

In a further preferred embodiment, the repetition frequency in the camera tube is a function of the radius of the scanning circles. Therein, the scanning frequency is larger for centrally located, small circles, and smaller for large circles situated nearer to the image edge. The image at the edge, having comparatively low light intensity, then has a longer build-up period. The advantage thereof is that, at the same current characteristic of the camera tube, the image has uniform brightness from the centre towards the edge.

In the embodiment shown in FIG. 1, the imaging device is composed of a convential electron microscope in which a diffraction image of an object is realized. The imaging device may also be a scanning electron microscope and in particular a scanning transmission electron microscope in which a cathode as described in French Patent 2,119,692 can be used so as to obtain a sufficiently large signal. When a scanning transmission microscope is used, it is often desired to know the angular distribution of the electrons dispersed by the object in each point of the object. It is known ("Crewe Quarterly Reviews of Biophysics" Vol. 3, page 137, Great Britain, 1970) to arrange an annular detector at some distance behind the object. All electrons which are dispersed outside a given space angle, determined by the geometry of the arrangement, are measured as an integrated signal.

More detailed information about the angular distribution can be obtained by using a device according to the invention. To this end, the television camera tube is arranged in the plane of observation, for example, in the plane of the said annular detector, and therein the dispersion figure is measured in, for example, 10 to 20 circles for each object element scanned. This device thus constitutes a variable annular detector having a geometry which is adjustable by selection of the number of scanning circles, it being possible to correlate the scanning of the object and the scanning of the target of the television camera tube by simple television techniques. The results thus obtained can be used for achieving optimum contrast in imaging.

A corresponding measuring method may also be applied when use is made of a scanning electron microscope which is constructed as a scanning reflection electron microscope. In that case the object is not penetrated by the electrons, but the electrons are reflected on a surface of the object, the reflection angle preferably being comparatively large.

Further examples of imaging devices in which a device according to the invention can be advantageously used are, for example, light-optical diffracto meters and devices for X-ray diffraction. In process control, for example, in which an evaluation standard for a product is obtained by means of X-ray diffraction, information can be quickly obtained using the device according to the invention. In the case of a deviation accompanied by an anticipated change in the diffraction image, the process can then be readily adjusted via a connected computer on the basis of the measuring results obtained. The application is not restricted to the measuring of diffraction images, but it is particularly suitable for this purpose. The measuring of other centre-symmetrical images is possible in a fully analogous manner. However, if a real electron-optical image is to be measured, this image must of course be really imaged on the target. In the case of diffraction images, the target may in principle be inserted anywhere in the beam in the transverse direction. However, in that case a section of the dispersed electron beam which is imaged on a phosphor screen will usually be imaged on the target.

It is often necessary in a conventional electron microscope to localize given object elements of an object. An example in this respect is the localization and possibly the counting of crystals of an amorphous carbon carrier. During diaphragm-scanning of the object over a selected area when using a device according to the invention, it is possible to expose and record those object elements whose diffraction image corresponds to a preset diffraction-image figure in the device.

What is claimed is:

1. Apparatus for analysing a center-symmetrical diffraction pattern comprising:
   a television camera tube;
   means for controlling the electron beam of said camera tube to scan a target of said camera tube in a center-symmetrical scan pattern;
   means for imaging a center-symmetrical diffraction pattern onto said target, the centers of symmetry of said image pattern and said scan pattern coinciding; and
   means for integrating the image signal of said camera tube over at least one portion of said scan pattern, whereby said integrated image signal is a measure of the region within said at least one portion of said scan pattern covered by said image pattern.

2. Apparatus as defined in claim 1 wherein said scan pattern comprises a helix.

3. Apparatus as defined in claim 1 wherein said scan pattern comprises a plurality of concentric circular scan lines.

4. Apparatus as defined in claim 3 wherein said means for imaging includes an electron microscope for producing from materials diffraction patterns comprising at least portions of concentric circular bands.

5. Apparatus as defined in claim 3 wherein said integrating means comprises means for integrating the image signal of said camera tube over predetermined segments of said scan pattern.

6. Apparatus as defined in claim 5 wherein said predetermined segments comprise arcuate portions of said circular scan lines.

7. Apparatus as defined in claim 5 wherein said predetermined segments comprise entire circular scan lines.

8. Apparatus as defined in claim 5 wherein said predetermined segments comprise adjacent groups of circular scan lines.

9. Apparatus as defined in claim 5 wherein said means for controlling the electron beam includes means for maintaining substantially constant the electron density received by the target during scanning of the electron beam of said camera tube.

10. Apparatus as defined in claim 9 wherein said means for maintaining a constant electron density includes means for varying the intensity of the electron beam proportionally with the radius of said circular scan lines while maintaining a constant angular velocity for the electron beam over said scan lines.

11. Apparatus as defined in claim 9 wherein said means for maintaining a constant electron density includes means for varying the angular velocity of the electron beam in inverse proportion to the radius of said circular scan lines while maintaining a constant electron beam intensity over said circular scan lines.

12. Apparatus for analyzing center-symmetrical patterns, comprising:
   a television camera tube, comprising a target for an image, means for producing an electron beam to strike a small portion of said image, deflection electrodes for controlling the portion of said image struck by said beam, and output means for detecting and presenting an electrical signal responsive to the portion of said image struck by said beam;
   a deflection generator connected to said means for producing an electron beam and said deflection electrodes for center-symmetrically scanning said target;
   means for imaging a center-symmetrical pattern onto said target;
   an integrator responsive to said electrical signal;
   means for resetting said integrator in synchronism with said deflection generator to thereby cause said integrator to integrate said electrical signal over segments of the scan pattern; and
   means for detecting and presenting the amplitude of said integrator at the ends of said segments of the scan pattern, whereby said presented amplitudes are a measure of the regions within said segments covered by said image of said center-symmetrical pattern.

* * * * *